J. H. ELWARD.
Plow Colter.
No. 83,768.
Patented Nov. 3, 1868.
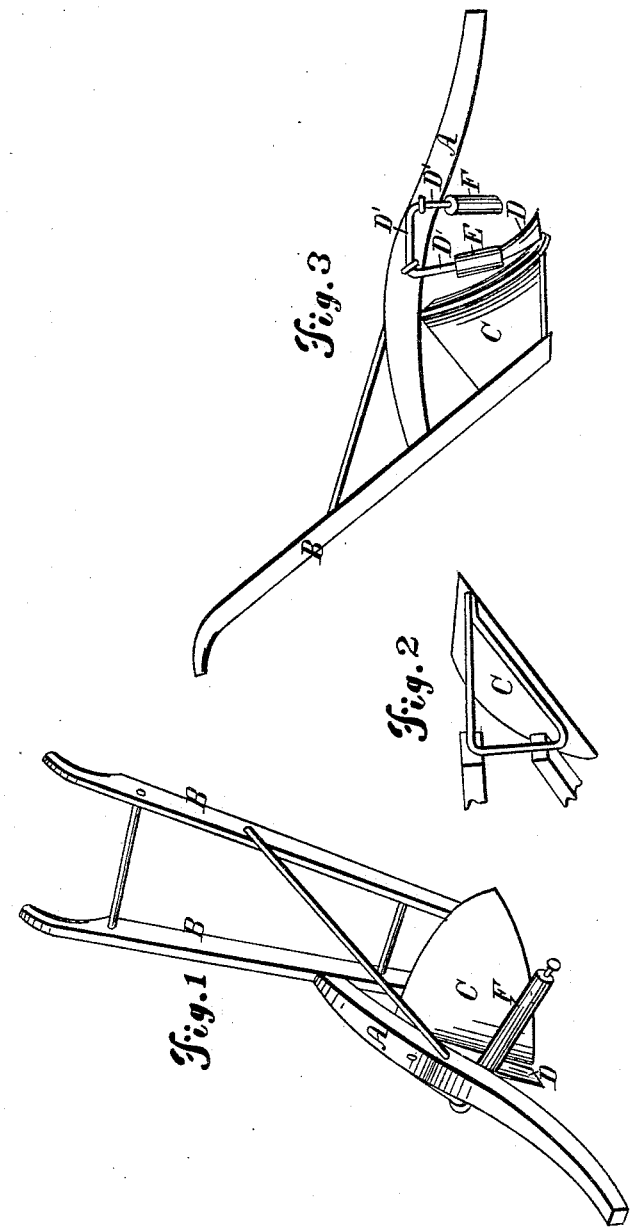

JOHN H. ELWARD, OF POLO, ILLINOIS.

Letters Patent No. 83,768, dated November 3, 1868.

IMPROVEMENT IN PLOWS.

The Schedule referred to in these Letters Patent and making part of the same.

*To all whom it may concern:*

Be it known that I, JOHN H. ELWARD, of Polo, in the county of Ogle, and State of Illinois, have invented a new and useful Improvement in Plows; and I do hereby declare that the following is a full, clear, and exact description of the same, reference being had to the annexed drawings, making part of this specification, in which—

Figure 1 is a perspective view.

Figure 2 is a plan of the bottom.

Figure 3 is a side elevation.

The same letters are used for the indication of the same parts in all the figures.

My improvement consists in attaching the coulter to a plow by a long shank, upon which there is a roller, as also other rollers upon a curved extension of the shank, which rollers are used for the purpose of throwing off the weeds, grass, &c., catching upon the coulter, and causing the same to be turned under by the plow.

In the annexed drawings, A is the beam, B, the handles, and C, the mould-board, of any ordinary plow.

D is the coulter, which is attached to the beam by a rounded shank, or rod, D'. This rod is nearly vertical between the beam and the edge of the coulter. It is then bent and carried along the beam towards the front, and then again bent and carried under the beam, and extended outwards at right angles to the beam in front of the mould-board, and extended as far as the outer corner of the mould-board.

A roller, E, is placed upon the shank D', turning freely thereon, and the roller F is placed on the projecting outer end of the extension of said shank or rod.

My invention is not restricted to this peculiar form of the coulter and rod D', nor this peculiar arrangement of rollers, for they may be changed in arrangement or relative position, according to circumstances.

My invention is distinguished from all other plows, in the addition of rollers connected with the coulter, for the purpose of throwing off the trash which often seriously impedes the operation of the plow, and holding the same until it is turned under by the plow.

What I claim as my invention, and desire to secure by Letters Patent, is—

The combination of the coulter D, the rounded shank or rod D', and rollers attached thereto, substantially as and for the purpose set forth.

In testimony whereof, I have signed my name to this specification, in the presence of two subscribing witnesses.

J. H. ELWARD.

Witnesses:
S. SPRECHER,
L. GORDON.